United States Patent [19]
Jones

[11] Patent Number: 5,235,851
[45] Date of Patent: Aug. 17, 1993

[54] APPARATUS FOR THE MEASUREMENT OF VOLUMETRIC CAPACITY OF ANILOX ROLLS

[75] Inventor: Matthew Jones, Aurora, Ill.

[73] Assignee: Pamarco Incorporated, Roselle, N.J.

[21] Appl. No.: 822,100

[22] Filed: Jan. 17, 1992

[51] Int. Cl.$^5$ ............................................. G01F 17/00
[52] U.S. Cl. ....................................................... 73/149
[58] Field of Search ............... 73/149; 401/9, 10, 132, 401/137, 138, 143, 183–185, 192, 194; 604/290, 293, 305, 307, 318

[56] References Cited

U.S. PATENT DOCUMENTS

| | | | |
|---|---|---|---|
| 1,229,195 | 6/1917 | Hamilton | 401/132 |
| 2,601,851 | 7/1952 | Jones | 604/293 |
| 3,367,332 | 2/1968 | Groves | 604/290 |
| 3,998,559 | 12/1976 | Hoyt | 401/132 |
| 4,628,728 | 12/1986 | Taylor et al. | 73/149 |
| 5,000,172 | 3/1991 | Ward | 604/307 |
| 5,019,033 | 5/1991 | Geria | 401/183 |
| 5,037,380 | 8/1991 | Jacobsen et al. | 604/307 |

Primary Examiner—Robert Raevis
Attorney, Agent, or Firm—Mark T. Basseches; Paula T. Basseches

[57] ABSTRACT

A device and method for obtaining a direct reading of the cell volume of the cells of an anilox roller is disclosed. The device includes a transparent strip to be applied against the surface of an anilox roll to be measured, the undersurface of the strip including a seal area surrounding an elongate channel. Fluid is introduced into the channel and is spread along the surface of the roll by forcing the portions of the strip defining the upper surface of the channel against the roll surface to fill the cells in registry with the channel. A reading is obtained in accordance with the length of the channel which is filled by the fluid. Index markings may be provided on the strip to permit a direct readout of cell volume.

6 Claims, 2 Drawing Sheets

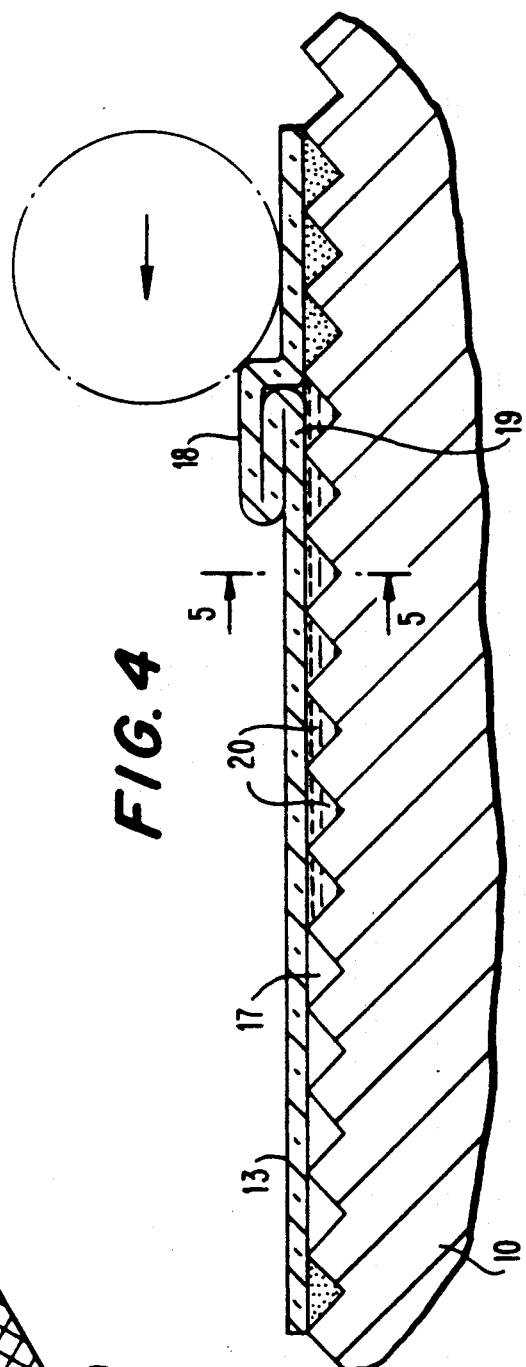
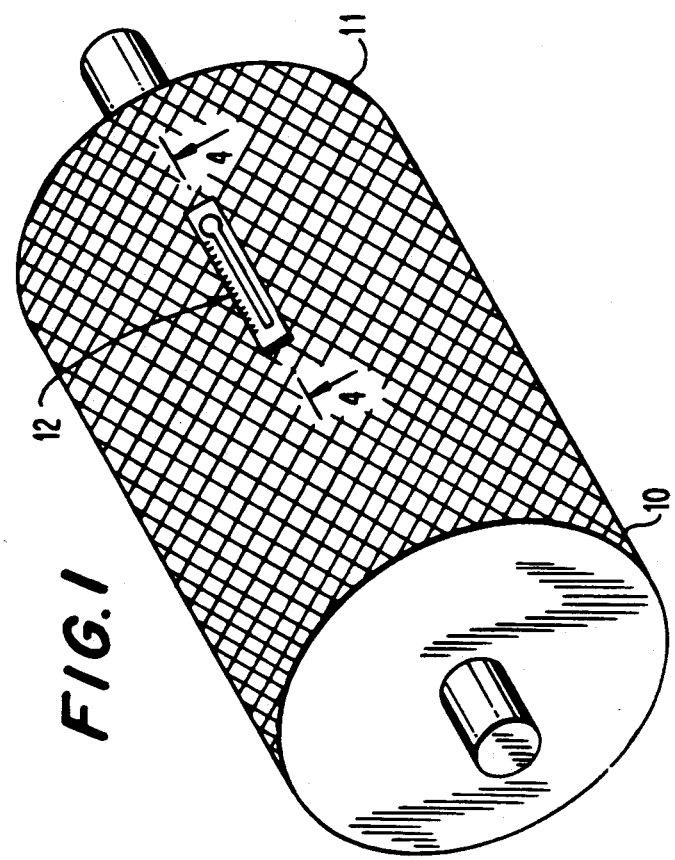

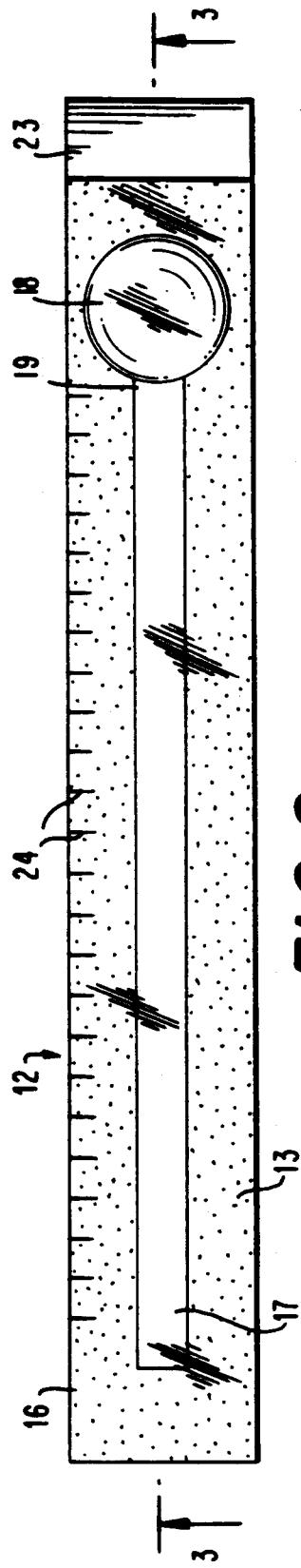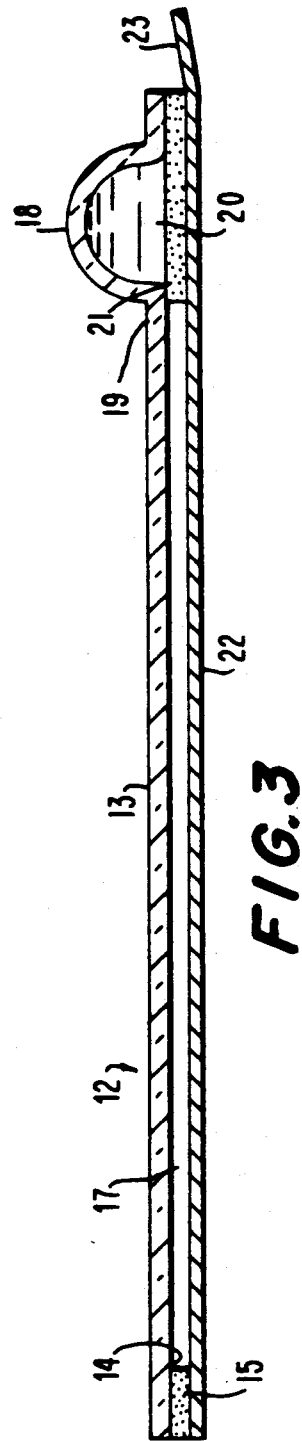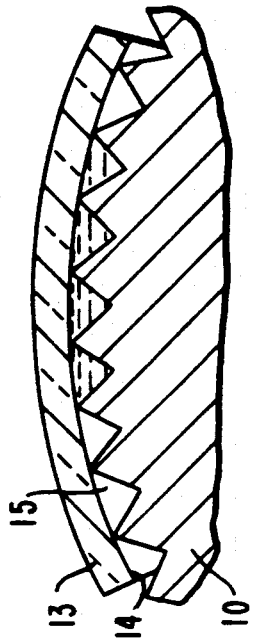

APPARATUS FOR THE MEASUREMENT OF VOLUMETRIC CAPACITY OF ANILOX ROLLS

BACKGROUND OF THE INVENTION

1. Field of the Invention

The present invention is in the field of anilox rollers and relates more particularly to a device and method for measuring the volumetric capacity of the cells of anilox rolls and to an inexpensive disposable device for rapidly effecting such measurement.

2. The Prior Art

Anilox rolls (such term to include fluid metering or fluid transfer rollers) are employed in various industries, and particularly the printing industry for the purpose of transmitting metered quantities of a fluid, such as printing ink from a fountain or like fluid supply to a surface such as the surface of a printing cylinder. Such anilox rolls are comprised of cylinders, the surface of which is formed with a multiplicity of regularly spaced indentations or cells of any of a variety of geometric shapes and concentrations in accordance with the end use of the roll.

In application, the surface of the roll is contacted either directly with liquid contained in a fountain or with a roll which in turn is immersed partially in the fountain, such that the surface of the anilox roll is progressively coated with the fluid to be metered. The surface of the coated roll is thereafter scanned by a doctor blade, squeegee or like expedient which functions to remove excess fluid from the land areas between the cells, whereby the fluid carried by the anilox roll is encompassed entirely within the cells.

The surface of the roll, after doctoring, is thereafter applied against the roll or surface to which the fluid is to be transferred, illustratively the print cylinder of a printing press, whereby precisely measured quantities of fluid are transferred from the cells to the contacting surface.

The surface of the anilox roll may be formed of metal or more recently of ceramic.

Since the quantity of fluid transferred is, in large measure a function of the volume of the cells, it will be readily appreciated that with use and consequent wear of the cylinder surface, the volumetric capacity of the cells will progressively decrease.

While the volumetric decrease of cell capacity can, to a degree, be compensated by varying the characteristics of the ink employed, it is important for the user to be able to measure the cell capacities from time to time after periods of use.

Volumetric capacity of cells is conventionally expressed in terms of billion cubic microns (BCM) per square inch and in accordance with the intended end use may vary from as low as about 1 BCM per square inch to 300 or more BCM per square inch.

One known method for measuring the volumetric capacity of the cells of an anilox roll is discussed in U.S. Pat. No. 4,628,728 of Dec. 16, 1986.

In accordance with such method, a precisely metered quantity of fluid is deposited on a surface area of the roll to be measured. Thereafter a sheet of graph paper is superposed over the ink deposit and the sheet is doctored or roller pressed so as to follow the surface contours of the land areas of the roller and spread the deposited liquid. As a result, the fluid fills the cells of a certain surface area of the roller.

Upon removal of the graph paper an ink blot will remain on the graph paper, the area of which is inversely proportional to the cell volume, i.e. the lower the cell volume the wider spread the blot and vice versa.

In order to derive an empirical value in BCM, the user must first establish the precise area of the blot. In order to determine the blot area, it is necessary for the user to count the number of squares of the graph paper which are filled and partially filled, a procedure which is time consuming and somewhat inaccurate in that counting of partially filled squares (whether less than or more than half filled) involves subjective decisions.

In addition, the use of a pipette to transfer fluid itself involves a source of inaccuracy.

After determining the area of the blot, the user must mathematically compute the volume in BCM in accordance with a formula as set forth in the noted patent.

In order to simplify the area measurement required by the aforesaid patent, there is provided, in accordance with U.S. Pat. No. 4,800,287 of Jan. 24, 1989 an electronic area measuring device wherein the area is determined in accordance with stored pixel data.

Devices in accordance with the '287 patent are costly, being priced in the area of many thousands of dollars, and accordingly it is impracticable for any but the largest users of anilox rollers to own such apparatus.

SUMMARY OF THE INVENTION

The present invention may be summarized as directed to an inexpensive disposable cell volume measuring device for anilox rolls wherein the disadvantages of existing devices, including accurate application of fluid, area measurement difficulties, and mathematical computations, are obviated.

More particularly, the invention is directed to an accurate, inexpensive and disposable cell volume measuring device wherein a direct reading in BCM may be rapidly achieved.

Still more particularly the invention is directed to a device of the type described which is comprised of a flexible, transparent relatively inextensible membrane or sheet, such as cellophane or acetate, the under surface of which is coated in a predetermined pattern with a layer of pressure sensitive adhesive, the adhesive being applied in such manner as to define an elongate (straight or arcuate) uncoated channel on such surface, the margins of the channel being defined by the adhesive.

At one end of the channel is formed an enclosure or pouch defined by an enlargement of the sheet or membrane or by an ancillary sack of compliant material, which enclosure is filled with a metered quantity of ink or like fluid which contrasts in color to the membrane or sheet. Preferably, the membrane or a carrier bonded to the membrane is provided with index markings alongside the channel defined by the pressure sensitive adhesive.

The device is used by placing the pressure sensitive surface against the surface of the roll to be metered, preferably but not necessarily generally parallel to the roller axis, and forcing the pressure sensitive areas surrounding the channel tightly against the roller surface to thereby form a dam or seal against the roller surrounding the uncoated channel.

The adhesive is embedded into the cells surrounding the channel such that the uncoated portion of the membrane engages directly against or is closely adjacent the cell crests. When thus positioned, the user by squeegee or the like ruptures the sack containing the ink and causes, by such squeegeeing action continued in the direction of elongation of the channel, the fluid within the sack to be expelled along the length of the sealed channel. The fluid will thus flow away from the sack and along the length of the channel for a distance which is a function of the volume of the cells along the channel.

If, by way of example, the channel is 8" long and ⅛" wide it will be appreciated that the total area of the channel is 1 square inch.

It will be further appreciated that the greater the volume of the cells in registry with the channel, the shorter the length of the channel which will be filled by the expressed ink.

It is accordingly possible by placing appropriate index markings along the length of the film adjacent the channel to obtain a direct reading in BCM in the manner of a thermometer for example.

In is accordingly an object of the invention to provide an accurate, inexpensive, directly readable and preferably disposable device for measuring the volumetric capacity of the cells of an anilox roller.

BRIEF DESCRIPTION OF THE DRAWINGS

FIG. 1 is a schematic perspective view of an anilox roller with the device of the invention applied to a portion of the surface thereof.

FIG. 2 is a magnified plan view of a measurement device in accordance with the invention.

FIG. 3 is a vertical section through the device of FIG. 2 taken on the line 3—3 of FIG. 2.

FIG. 4 is a magnified cross sectional view taken along lines 4—4 of FIG. 1.

FIG. 5 an enlarged cross sectional view taken on line 5—5 of FIG. 4.

DETAILED DESCRIPTION OF DRAWINGS

Referring now to the drawings wherein the dimensions of component parts have been exaggerated for clarity of illustration, there is schematically illustrated in FIG. 1 an anilox roller 10, the surface 11 of which is covered by a multiplicity of fluid retaining cells.

Anilox rolls of this sort are well known, a representative example thereof being illustrated and described in U.S. Pat. No. 4,819,558, dated Apr. 11, 1989, incorporated herein by reference.

The cell configurations, sizes and concentrations may be varied in accordance with the intended end use, as is well known in the art.

There is shown applied to the anilox roll 10, a volumetric measuring device 12 in accordance with the invention.

Schematically shown in FIGS. 2 and 3 is a measuring device 12 prior to activation. The device 12 is comprised of a transparent layer, sheet or membrane 13, illustratively of acetate, cellophane or the like, which is relatively inextensible longitudinally but is sufficiently flexible to permit its conforming to the configuration of the roller surface.

The under surface 14 of the sheet 13 is provided with a soft complaint layer of pressure sensitive adhesive 15. The layer 15 covers the shaded areas 16, as shown in FIG. 2, defining on the under surface 14 a central channel 17 free of adhesive.

A sack 18 is formed adjacent the end 19, the sack being filled with a colored fluid such as an ink 20. The sack 18 may be formed integrally with the sheet 13 or may be formed as a separate component.

A readily ruptured bond 21 is formed at the end 19 of the channel 17, the bond 21 defining a seal of the sack.

Preferably, prior to use, the under surface of the adhesive layer 15 is covered by a release sheet 22 having a projecting tab 23.

The sheet 13 adjacent panel 17 is provided with a series of index markers or graduations 24, which graduations may include thereadjacent, numerals signifying in direct reading the volume in BCM of the cells, the higher numbers being disposed adjacent the end 19 of the channel, the numbers being lower progressively at distances remote from the end 19.

As schematically shown in FIGS. 4 and 5, the device is used by stripping the release sheet 22 and forcing the adhesive component defining channel 19 tightly against the surface of the roller 10, as by a doctor blade, a rigid squeegee or the like. The adhesive forms a dam or seal with the roller surface, whereby the non-adhesive covered channel 19 provides a limited fluid path.

With the device thus positioned, pressure is exerted against the sack 18, causing the rupture of bond 21 and forcing the fluid 20 to be expressed along the length of the channel 19, care being taken to evacuate the entirety of the contents of the sack.

As shown in FIG. 4, the fluid will travel along the length of channel 17 away from end 19, a distance which is a function of the volume of the cells encompassed within the area of the channel, whereby direct reading in BCM may be derived by reference to the indicia 24.

The squeegee is shifted lengthwise away from sack 18 causing the fluid to enter the cells in registry with channel 19 until the channel is filled to a length which is a function of the cell volume. By reference to the indicia 24 a direct reading of cell volume, for example in BCM, may be obtained with no requirement for counting or calculation.

The device is preferably a one-time use apparatus and will be disposed of after a volume measurement is made. It is, however, feasible to employ, instead of a pressure sensitive area defining channel 19, a thin elastomeric seal which, while not necessarily adhering to the roll surface, defines a boundary forming the channel. The device may be made in a variety of sizes for use with rolls of varying cell volume ranges. It is inexpensive, accurate and easy to use, encouraging frequent checks of cell capacity and thus assuring optimum fluid transfer.

Numerous variations in details of construction will occur to skilled workers in the art familiarized with the instant disclosure without departing from the spirit of the invention. Accordingly, the invention is to be broadly construed within the scope of the appended claims.

Having thus described the invention and illustrated its use, what is claimed as new and is desired to be secured by Letters Patent is:

1. The method of directly deriving an empirical value of the volume of cells of an anilox roll which comprises the steps of providing a flexible strip having a surface coated with seal means in a pattern defining the boundary of an elongate uncoated portion of said surface, applying said seal means against the surface of an anilox roll to be measured to define between said uncoated portion of said surface, said seal means and said surface of said roll an elongate channel, introducing into said channel at an end thereof a metered quantity of fluid and causing said fluid to traverse said channel in a direction away from said end thereof.

2. The method in accordance with claim 1 and including the step of causing said fluid to traverse said channel by applying pressure means against said strip at a position upstream of said fluid and thereafter progressively advancing said pressure means against said strip in a direction away from said end of said channel thereby to urge successive increments of said uncoated portion of said surface of said strip against said surface of said roll.

3. The method in accordance with claim 2 wherein said seal means comprises a pressure sensitive adhesive, the method including the step of bonding said strip to said roll surface using said pressure sensitive adhesive.

4. The method in accordance with claim 2 wherein said strip includes index marks adjacent said channel.

5. The method in accordance with claim 2 and including the step of introducing said metered quantity of fluid into said channel by forcing said fluid from a pouch communicating with said channel into said channel by pressure exerted against said pouch.

6. In combination, an anilox roll having recessed cells forming an exterior surface thereof, said cells terminating at cell crests at the periphery of said roll, and an apparatus for measuring the volumetric capacity of said cells, said apparatus comprising a generally planar flexible polymeric strip having an upper and a lower surface, a coating forming a seal means on portions of said lower surface of said strip, said seal means surrounding an elongate uncoated area of said lower surface, said uncoated area being disposed in engagement with said cell crests, said seal means defining an elongated sealed chamber between said lower surface area and said roll surface, and means on said strip for interposing a predetermined quantity of liquid into said chamber at an end thereof.

* * * * *